United States Patent
Keitsch et al.

(10) Patent No.: US 12,451,507 B2
(45) Date of Patent: Oct. 21, 2025

(54) FUEL CELL STACK, FUEL CELL DEVICE AND MOTOR VEHICLE WITH FUEL CELL DEVICE

(71) Applicant: AUDI AG, Ingolstadt (DE)

(72) Inventors: Oliver Keitsch, Heilbronn (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 432 days.

(21) Appl. No.: 18/007,257

(22) PCT Filed: Jun. 8, 2021

(86) PCT No.: PCT/EP2021/065206
§ 371 (c)(1),
(2) Date: Jan. 27, 2023

(87) PCT Pub. No.: WO2022/089787
PCT Pub. Date: May 5, 2022

(65) Prior Publication Data
US 2023/0268542 A1 Aug. 24, 2023

(30) Foreign Application Priority Data
Oct. 28, 2020 (DE) .................. 10 2020 128 312.1

(51) Int. Cl.
| | |
|---|---|
| *H01M 8/248* | (2016.01) |
| *H01M 8/0202* | (2016.01) |
| *H01M 8/04664* | (2016.01) |
| *H01M 8/10* | (2016.01) |

(52) U.S. Cl.
CPC ......... *H01M 8/248* (2013.01); *H01M 8/0269* (2013.01); *H01M 8/04671* (2013.01); *H01M 2008/1095* (2013.01)

(58) Field of Classification Search
CPC . H01M 8/248; H01M 8/0269; H01M 8/04671
See application file for complete search history.

(56) References Cited

U.S. PATENT DOCUMENTS

| | | |
|---|---|---|
| 2005/0213409 A1 | 9/2005 | Wakahoi et al. |
| 2007/0087237 A1 | 4/2007 | An et al. |

FOREIGN PATENT DOCUMENTS

| | | |
|---|---|---|
| CN | 110323463 A | 10/2019 |
| DE | 102017215560 A1 | 3/2019 |
| DE | 102018127490 A1 | 5/2019 |

(Continued)

OTHER PUBLICATIONS

International Search Report, mailed Oct. 19, 2021, for International Patent Application No. PCT/EP2021/065206. (2 pages).

(Continued)

*Primary Examiner* — Sarah A. Slifka
(74) *Attorney, Agent, or Firm* — Seed Intellectual Property Law Group LLP

(57) ABSTRACT

A fuel cell stack includes a plurality of fuel cells arranged in the direction of the stack and tensioned by means of tension elements, of which at least one has a cell voltage tap for electrical connection to a cell monitoring unit, wherein the at least one cell voltage tap is mechanically secured by at least one of the tension elements as regards the connection to the fuel cells. A fuel cell device and a motor vehicle with a fuel cell device are also provided.

11 Claims, 1 Drawing Sheet

(56) References Cited

FOREIGN PATENT DOCUMENTS

| | | |
|---|---|---|
| EP | 1037296 A1 | 9/2000 |
| EP | 3035430 A1 | 6/2016 |
| JP | 2002313399 A | 10/2002 |
| JP | 2014007152 A | 1/2014 |

OTHER PUBLICATIONS

Written Opinion of the International Searching Authority, dated Oct. 19, 2021, for International Patent Application No. PCT/EP2021/065206. (6 pages).

FUEL CELL STACK, FUEL CELL DEVICE AND MOTOR VEHICLE WITH FUEL CELL DEVICE

BACKGROUND

Technical Field

Embodiments of the invention relate to a fuel cell stack with a plurality of fuel cells arranged in the direction of the stack and tensioned by means of tension elements. Embodiments of the invention further relate to a fuel cell device and a motor vehicle with a fuel cell device.

Description of the Related Art

Fuel cells are used for the chemical conversion of a fuel with oxygen to water in order to generate electrical energy. For this purpose, fuel cells contain a so-called membrane electrode arrangement as a core component, which is a composite of a proton-conducting membrane and an electrode, namely an anode and a cathode, arranged on both sides of the membrane. In addition, gas diffusion layers can be arranged on both sides of the membrane electrode arrangement on the sides of the electrodes facing away from the membrane. For increased performance, several fuel cells can be connected in series to form a fuel cell stack.

In operation, the fuel, in particular hydrogen ($H_2$) or a gas mixture containing hydrogen, is supplied to the anode, where electrochemical oxidation of $H_2$ to $H^+$ takes place with the release of electrons $e^-$ The protons $H^+$ are transported from the anode chamber to the cathode chamber via the membrane, which membrane separates the reaction chambers from one another in a gas-tight and electrically insulated manner. The electrons provided at the anode are supplied to the cathode via an electrical line. Oxygen or a gas mixture containing oxygen is supplied to the cathode, such that a reduction of $O_2$ to $O^{2-}$ takes place while the electrons are absorbed. At the same time, the oxygen anions in the cathode chamber react with the protons transported across the membrane to form water. Careful temperature management is also required, such that in addition to the reactants, a coolant for suitable temperature control of the fuel cell stack is supplied separately from the reactants to the respective active areas of the fuel cells, wherein a supply and removal takes place via so-called media ports. In addition to the membrane electrode arrangement, a fuel cell therefore usually has a bipolar plate in which a supply line, a discharge line and at least one media duct are formed for each medium, which in the case of the reactants is usually extended to form a flow field.

The plurality of fuel cells combined in a fuel cell stack is generally tensioned using tension elements with a force in the range of several tens of thousands of newtons in order to achieve sufficient contact pressure against the catalyst-coated membrane to reduce ohmic losses and to prevent leaks by means of the high compression.

In a fuel cell stack, the electrical voltages of each individual fuel cell are monitored to diagnose fault-free operation, for which purpose each individual fuel cell is electrically contacted and connected to a cell monitoring unit. This electrical contact requires compliance with appropriate quality requirements, in particular, when the fuel cell stack is used in a fuel cell device for a motor vehicle. If plug connectors are used for each of the fuel cells, a locking plug connection is generally required so that the electrical contact is not impaired under the influence of vibrations or mechanical shocks. There is, however, only limited space available on the bipolar plates that are used and this further increases their complexity. It is furthermore a disadvantage, in terms of design and assembly effort, that there are generally cable connections between the plug connectors and the cell monitoring unit.

DE 10 2017 215 560 A1 shows a fuel cell stack with a tensioning device comprising a tensile body, wherein a cable for a cell monitoring unit is attached to the tensile body. EP 1 037 296 A1 discloses a fuel cell stack in which the individual fuel cells are tensioned together by means of tie rods. The tie rods also serve as busbars. EP 3 035 430 A1 discloses an electrically conductive tensioning element which serves to contact one of the busbars.

BRIEF SUMMARY

Some embodiments include a fuel cell stack with a plurality of fuel cells arranged in the direction of the stack and tensioned by means of tension elements, of which at least one fuel cell, such as each fuel cell, has a cell voltage tap for electrical connection to a cell monitoring unit, wherein the at least one cell voltage tap is mechanically secured as regards the connection to the fuel cells by at least one of the tension elements. Some embodiments include a fuel cell device and a motor vehicle with a fuel cell device.

Some embodiments provide an improved fuel cell stack, an improved fuel cell device, as well as a motor vehicle with a fuel cell device, which mitigate or even eliminate the above-mentioned disadvantages.

The fuel cell stack mentioned at the beginning is characterized in that the mechanical securing of the cell voltage taps is achieved by an already existing, indispensable component which is designed to be mechanically very robust and stable due to its intended use. A change in position of the cell voltage tap is prevented by the tensioning element.

Each cell voltage tap may comprise a plug connector for a plug-in connection, and if the plug connectors are pre-assembled on the tensioning element, as this means that the tensioning element can also be used as an assembly aid and the production of the fuel cell stack is simplified while costs are reduced.

In this context, it may be advantageous if the tensioning element has pass-throughs for cables routed to the cell monitoring unit, such that the necessary connections can be made along the shortest routings and protected against external influences.

According to a further embodiment, it is possible that each plug connector is arranged on one of the fuel cells and that a mounting part for the plug connectors is accommodated in the tensioning element for the electrical connections to the cell monitoring unit. In this case, the plug connectors are formed by sockets and the mounting part is formed by an injection molded part through which the electrical connections are routed to a printed circuit board which is connected to the cell monitoring unit.

According to a further embodiment, the plug connector and the mounting part can be integrally combined in one component.

The fuel cells are tensioned between end plates by the tension elements, which are formed as rigid tension straps, such that these have a high mechanical load capacity and are suitable for securing the position of the plug connectors or sockets.

The above-mentioned effects and advantages also apply mutatis mutandis to a fuel cell device with such a fuel cell stack and to a motor vehicle with such a fuel cell device.

The features and combinations of features mentioned above in the description, as well as the features and combinations of features mentioned below in the description of the figures and/or only shown in the figures are not only valid in the respectively indicated combination, but also in other combinations or as stand-alone elements. Thus, embodiments are also to be regarded as encompassed and disclosed which are not explicitly shown or explained in the figures, but which however arise from separate combinations of features from or generated by the elucidated embodiments.

BRIEF DESCRIPTION OF THE SEVERAL VIEWS OF THE DRAWINGS

Further advantages, features and details will be apparent from the claims, from the following description of embodiments and from the drawings.

DETAILED DESCRIPTION

Figure 1:
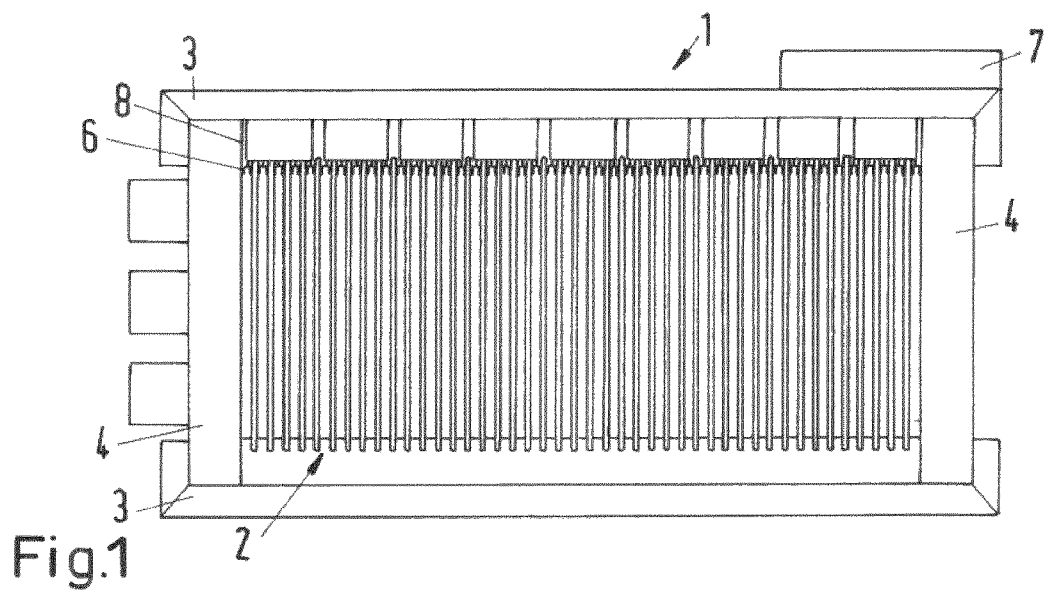
FIG. 1 shows a schematic representation of a fuel cell stack, which is made up of a plurality of fuel cells, which are tensioned together by tension elements, which also serve to secure the plug-in connections.

A fuel cell device has a fuel cell stack 1 with a plurality of fuel cells 2 arranged in the direction of the stack.

Each of the fuel cells 2 comprises an anode, a cathode and a proton-conducting membrane separating the anode from the cathode. The membrane is formed from an ionomer, such as a sulfonated polytetrafluorethylene (PTFE) or a perfluorinated sulfonic acid (PFSA) polymer. Alternatively, the membrane may be formed as a sulfonated hydrocarbon membrane.

Fuel, in particular hydrogen, can be supplied to the anode from a fuel tank via an anode chamber. In a polymer electrolyte membrane fuel cell (PEM fuel cell), fuel or fuel molecules are split into protons and electrons at the anode. The PEM allows the protons to pass through, but it is impermeable to the electrons. The reaction: $2H_2 \rightarrow 4H^+ + 4e^-$ (oxidation/electron release) occurs, for example, at the anode. Whereas the protons pass through the PEM to the cathode, the electrons are routed via an external circuit to the cathode or to an energy storage device.

The cathode gas (for example, oxygen or oxygen-containing air) can be supplied to the cathode via a cathode chamber, such that the following reaction takes place on the cathode side: $O_2 + 4H^+ + 4e^- \rightarrow 2H_2O$ (reduction/electron capture).

The fuel cell stack 1 also has a tensioning device formed by tension elements 3 for pressing the fuel cells 2 together. End plates 4 are assigned to the terminal fuel cells 2, to which plates the tensioning device is connected for the application of force, wherein the media ports 5 (shown only in FIG. 3) for the fuel, the oxidant, and a coolant are arranged on one of the end plates 4 or also on both end plates 4; on the left-hand end plate 4 in the embodiment examples shown in the drawing. The tension elements 3 are formed as rigid tension straps, which can, in particular, be made of metal with the corresponding mechanical properties with regards to strength and flexural rigidity.

The fuel cell stack 1 may also have a cell voltage tap 6 for each of the fuel cells 2 for electrical connection to a cell monitoring unit 7 in order to enable diagnosis of fault-free operation. The cell voltage taps 6 are mechanically secured as regards the connection to the fuel cells 2 by at least one of the tension elements 3.

FIG. 1 shows an embodiment in which each cell voltage tap 6 comprises a plug connector 8 for a plug-in connection, such that in this embodiment the focus is on additional mechanical securing. In addition, the plug connectors 8 can also be pre-assembled on the tensioning element 3 such that the tensioning element 3 can be used as an assembly aid, wherein the tensioning element 3 has pass-throughs for cables routed to the cell monitoring unit 7.

Figure 2:
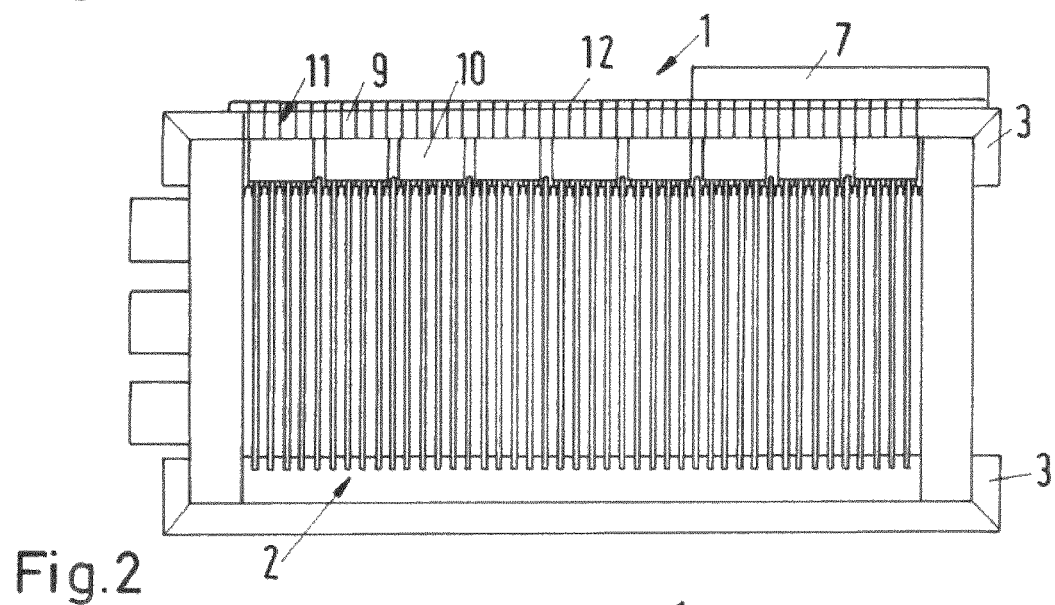
FIG. 2 shows a representation corresponding to FIG. 1 with plug connectors mounted on the fuel cells, which connectors are connected to the cell voltage monitoring unit by connecting elements associated with a tensioning element.

FIG. 2 shows an embodiment in which each plug connector 8 is arranged on one of the fuel cells 2, wherein a mounting part 9 for the plug connectors 8 is accommodated in the tensioning element 3 for the electrical connections to the cell monitoring unit 7, which is to say that the plug connectors 8 are formed by sockets 10 and the mounting part 9 by an injection-molded part 11, through which the electrical connections are routed to a printed circuit board 12, which is electrically and, in particular, mechanically connected to the cell monitoring unit 7.

Figure 3:
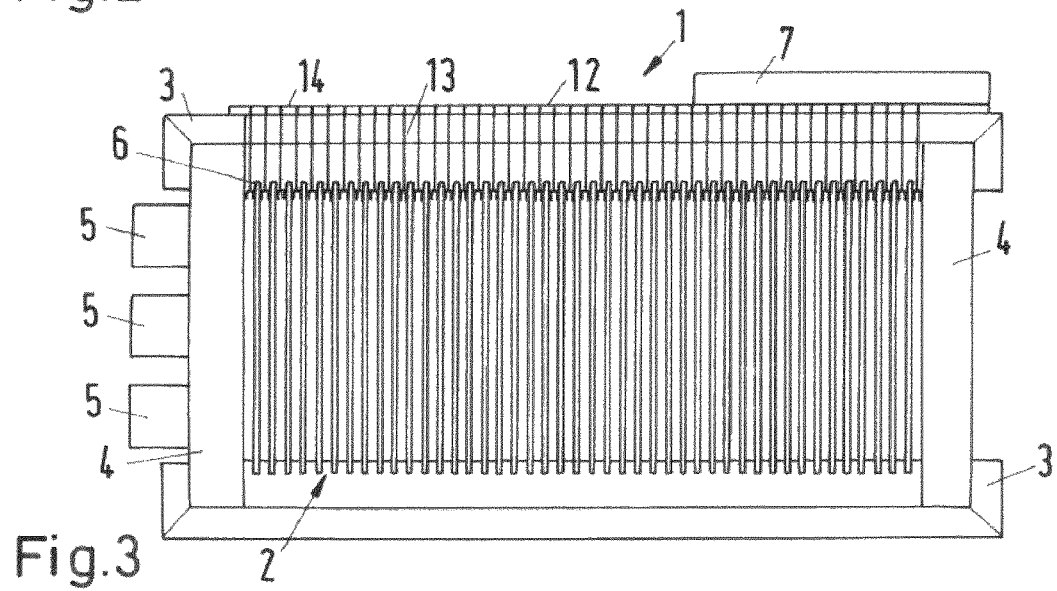
FIG. 3 shows a representation corresponding to FIG. 1, in which the plug connector and a mounting part are integrated in a tensioning element.

FIG. 3 shows an embodiment in which the plug connector 6 and the mounting part 9 are moreover integrally combined in one component 13 that is integrated in the tensioning element 3. The contact on component 13 is implemented with an overhang 14, such that the connection to the cell monitoring unit 7 can be implemented with solder contacts via the printed circuit board 12.

Fuel cell devices with a fuel cell stack 1 of this type demonstrate their advantages in particular when used in a motor vehicle, since exceptional mechanical loads and vibrations are present there.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
   a plurality of fuel cells arranged in the direction of the stack and tensioned by tension elements,
   wherein at least one of the fuel cells has a cell voltage tap for electrical connection to a cell monitoring unit, and
   wherein the at least one cell voltage tap is mechanically secured as regards the connection to the fuel cells by at least one of the tension elements.

2. The fuel cell stack according to claim 1, wherein each cell voltage tap comprises a plug connector for a plug-in connection.

3. The fuel cell stack according to claim 2, wherein the plug connectors are pre-assembled on the tensioning element.

4. The fuel cell stack according to claim 1, wherein the tensioning element has pass-throughs for cables routed to the cell monitoring unit.

5. The fuel cell stack according to claim 1, wherein each plug connector is arranged on one of the fuel cells, and wherein a mounting part for the plug connectors is accommodated in the tensioning element for the electrical connections with the cell monitoring unit.

6. The fuel cell stack according to claim 5, wherein the plug connectors are formed by sockets and the mounting part is formed by an injection molded part through which the electrical connections are routed to a printed circuit board which is connected to the cell monitoring unit.

7. The fuel cell stack according to claim 5, wherein the plug connector and the mounting part are integrally combined in one component.

8. The fuel cell stack according to claim 1, wherein the fuel cells are tensioned between end plates by the tension elements which are formed as rigid tension straps.

9. The fuel cell stack according to claim 1, wherein each of the fuel cells has a respective cell voltage tap for electrical connection to the cell monitoring unit.

10. A fuel cell device with a fuel cell stack, comprising:
   a plurality of fuel cells arranged in the direction of the stack and tensioned by tension elements,
   wherein at least one of the fuel cells has a cell voltage tap for electrical connection to a cell monitoring unit, and
   wherein the at least one cell voltage tap is mechanically secured as regards the connection to the fuel cells by at least one of the tension elements.

11. A motor vehicle having a fuel cell device with a fuel cell stack, the motor vehicle comprising:
   a plurality of fuel cells arranged in the direction of the stack and tensioned by tension elements,
   wherein at least one of the fuel cells has a cell voltage tap for electrical connection to a cell monitoring unit, and
   wherein the at least one cell voltage tap is mechanically secured as regards the connection to the fuel cells by at least one of the tension elements.

* * * * *